United States Patent Office 3,120,533
Patented Feb. 4, 1964

3,120,533
ALKYL 18-DESOXY-18-AMINO DESERPIDATES AND RELATED COMPOUNDS
Michael Mullen Robison, Berkeley Heights, and Robert Armistead Lucas, Mendham, N.J., assignors to Ciba Corporation, New York, N.Y., a corporation of Delaware
No Drawing. Filed July 3, 1962, Ser. No. 207,417
9 Claims. (Cl. 260—287)

The present invention relates to 20α-yohimbane compounds having the ring system of the formula

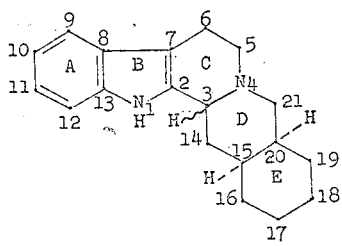

in which the hydrogen atom attached to the 3-position may have the α-configuration or the β-configuration. More especially, it relates to 18-N-substituted amino-17α-$R_2$-20α-yohimbane 16-carboxylic acid esters, in which $R_2$ is hydrogen or lower alkoxy, and in which the hydrogen attached to the 3-position, the amino group attached to the 18-position, and the esterified carboxyl group attached to the 16-position may have the α-configuration or the β-configuration, and salts, N-oxides or salts of N-oxides of such compounds. Apart from the groups in the 16-position, the 17α-position and the 18-position, the compounds of the present invention may contain additional substituents. For example, substituents attached to the positions of the aromatic nucleus, i.e. ring A, more specifically to the 9-position, the 10-position, the 11-position and/or the 12-position, are, for example, lower alkyl, etherified hydroxyl, such as lower alkoxy, lower alkylenedioxy and the like, esterified hydroxyl, such as halogeno and the like, etherified mercapto, such as lower alkylmercapto and the like, nitro, amino, such as N,N-di-lower alkyl-amino and the like, trifluoromethyl, or any other suitable substituent. Other substituents, such as lower alkyl and the like, may also be attached to positions of other nuclei, particularly of the heterocyclic nucleus C, more specifically to the 5-position and/or the 6-position.

The invention is more particularly directed to compounds of the formula

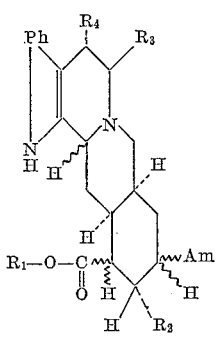

in which Ph is a 1,2-phenylene radical, $R_1$ is, above all, lower alkyl, as well as substituted lower alkyl, such as, for example, phenyl-lower alkyl, etherified hydroxy-lower alkyl, in which etherified hydroxy is separated from the carboxyl group by at least two carbon atoms, e.g. lower alkoxy-lower alkyl and the like, tertiary amino-lower alkyl, in which tertiary amino is separated from the carboxyl group by at least two carbon atoms, e.g. N,N-di-lower alkyl-amino-lower alkyl and the like, the group $R_2$ stands for hydrogen or lower alkoxy, each of the groups $R_3$ and $R_4$ stands for hydrogen or lower alkyl, and Am stands for an N-substituted amino group, salts, N-oxides or salts of N-oxides of such compounds, as well as process for the preparation of such compounds.

The 1,2-phenylene(o-phenylene) radical Ph stands for unsubstituted 1,2-phenylene or substituted 1,2-phenylene. Substituents of such 1,2-phenylene radical are, for example, aliphatic hydrocarbon radicals, especially lower alkyl, having preferably from one to four carbon atoms, e.g. methyl, ethyl, n-propyl, isopropyl, n-butyl and the like, or functional groups, such as, for example, etherified hydroxyl, particularly lower alkoxy, having preferably from one to four carbon atoms, e.g. methoxy, ethoxy, n-propyloxy, isopropyloxy, n-butyloxy, isobutyloxy and the like, as well as lower alkylene-dioxy, e.g. methylenedioxy, 1,1-ethylenedioxy and the like, esterified hydroxyl, particularly halogeno (representing hydroxyl esterified with a hydrohalic acid), e.g. fluoro, chloro, bromo, iodo and the like, etherified mercapto, particularly lower alkylmercapto, having preferably from one to four carbon atoms, e.g. methylmercapto, ethylmercapto and the like, nitro, amino, such as N,N-di-lower alkyl-amino, e.g. N,N-dimethylamino, N-ethyl - N - methyl-amino, N,N-diethyl-amino and the like, trifluoromethyl and the like, or any other suitable functional group.

Examples of 1,2-phenylene radicals representing the group Ph in the above formula are 1,2-phenylene, (lower alkyl)-1,2-phenylene, e.g. 3 - methyl - 1,2 - phenylene, 4-methyl-1,2-phenylene, 4-ethyl-1,2-phenylene and the like, (lower alkoxy)-1,2-phenylene, e.g. 3-methoxy-1,2-phenylene, 4-methoxy-1,2-phenylene, 3,4-dimethoxy-1,2-phenylene, 4,5 - dimethoxy - 1,2 - phenylene, 3,6-dimethoxy-1,2-phenylene, 3,4,5-trimethoxy-1,2-phenylene, 4-ethoxy-1,2-phenylene, 4-n-propyloxy-1,2-phenylene, 4-isopropyloxy-1,2-phenylene and the like, (lower alkylene-dioxy)-1,2-phenylene, e.g. 4,5-methylenedioxy-1,2-phenylene and the like, (halogeno)-1,2-phenylene, e.g. 4-fluoro-1,2-phenylene, 3-chloro-1,2-phenylene, 4-chloro-1,2-phenylene, 4-bromo-1,2-phenylene, 3,6-dichloro-1,2-phenylene and the like, (lower alkyl-mercapto)-1,2-phenylene, e.g. 4-methylmercapto-1,2-phenylene, 4-ethylmercapto-1,2-phenylene and the like, (N,N-di-lower alkyl-amino)-1,2-phenylene, e.g. 4-N,N-dimethylamino-1,2-phenylene, 4-N,N-diethylamino-1,2-phenylene and the like, (trifluoromethyl)-1,2-phenylene, e.g. 4-trifluoromethyl-1,2-phenylene and the like.

The esterified carboxyl group attached to the 16-position has, preferably, the β-configuration, but may possibly have the α-configuration, particularly if the compounds lack a substituent in the 17-position. The radical of the alcohol portion of the ester grouping attached to the 16-position of the molecule, which, in the above formula is represented by the group $R_1$, stands, above all, for lower alkyl having from one to seven, preferably from one to four, carbon atoms; such groups are particularly methyl, ethyl, n-propyl, isopropyl, n-butyl, isobutyl, secondary butyl, tertiary butyl, as well as n-pentyl, isopentyl, n-hexyl, n-heptyl and the like.

The esterifying portion of the ester grouping attached to the 16-position of the molecule, represented by the radical $R_1$ in the above formula, may also stand for substituted lower alkyl, such as, for example, phenyl-lower alkyl, e.g. benzyl, 1-phenylethyl, 2-phenylethyl and the like.

Other substituted lower alkyl radicals, as represented by the group $R_1$ in the above formula, are, for example, lower alkyl radicals substituted by functional groups, such as etherified hydroxyl, particularly lower alkoxy having preferably from one to four carbon atoms, e.g. methoxy, ethoxy, n-propyloxy, isopropyloxy, n-butyloxy and the like, or tertiary amino, such as N,N-di-lower alkyl-amino, in which lower alkyl has from one to four carbon atoms, e.g. N,N-dimethylamino, N-ethyl-N-methylamino, N,N-diethylamino, N,N-di-n-propylamino, N,N-di-isopropyl-amino and the like. The lower alkyl portion in a lower alkyl radical, substituted by functional groups, is lower alkylene, which has from two to four carbon atoms, and separates the functional group from the carboxyl group by at least two carbon atoms. Lower alkyl radicals having a functional group as a substituent are, for example, 2-lower alkoxy-ethyl, e.g. 2-methoxyethyl, 2-ethoxyethyl, 2-isopropyloxyethyl and the like, 2-lower alkoxy-propyl, e.g. 2-methoxy-propyl and the like, 3-lower alkoxy-propyl, e.g. 3-methoxypropyl, 3-ethoxypropyl and the like, 2-N,N-di-lower alkyl-ethyl, e.g. 2-N,N-dimethylaminoethyl, 2-N,N-diethylaminoethyl and the like, 2-N,N-di-lower alkyl-amino-propyl, e.g. 2-N,N-dimethylaminopropyl and the like, 3-N,N-di-lower alkyl-amino-propyl, e.g. 3-N,N-dimethylaminopropyl, 3-N,N-diethylaminopropyl and the like.

The group $R_2$ attached to the 17α-position may be hydrogen or lower alkoxy having from one to four carbon atoms, particularly methoxy, as well as ethoxy, n-propyloxy, isopropyloxy, n-butyloxy and the like.

Substituents, which may be attached to other positions in the molecule, particularly to positions in ring C, which are available for substitution, are primarily lower alkyl, having preferably from one to four carbon atoms, particularly methyl, as well as ethyl, n-propyl, isopropyl and the like. The groups $R_3$ and $R_4$ in the previously-given formula, which stand primarily for hydrogen, may, therefore, also represent lower alkyl, particularly methyl, as well as ethyl and the like.

The N-substituted amino group attached to the 18-position and represented in the above formula by the group Am, may have the α-configuration or the β-configuration.

An N-monosubstituted amino group is, for example, an N-aliphatic substituted amino group, particularly N-lower alkyl-amino, in which lower alkyl has from one to seven, preferably from one to four, carbon atoms, e.g. N-methyl-amino, N-ethyl-amino, N,n-propyl-amino, N-isopropyl-amino, N-n-butyl-amino and the like, as well as N-lower alkenyl-amino, in which lower alkenyl has from two to seven, preferably from three to five carbon atoms, e.g. N-allyl-amino and the like.

Another N-monosubstituted amino group is represented by an N-cycloaliphatic substituted amino group, such as N-cycloalkylamino, in which cycloalkyl has from three to eight, preferably from five to seven, carbon atoms, e.g. N-cyclopentylamino, N-cyclohexylamino, N-cycloheptyl-amino and the like, as well as N-cycloalkenyl-amino, in which cycloalkenyl has from five to eight, preferably from five to seven, carbon atoms, e.g. N-(2-cyclopentenyl)-amino, N-(3-cyclopentenyl)-amino, N-(1-cyclohexenyl)-amino, N-(3-cyclohexenyl)-amino and the like, or an N-cycloaliphatic-aliphatic substituted amino group, such as N-cycloalkyl-lower alkyl-amino, in which cycloalkyl has from three to eight, preferably from five to seven, carbon atoms, and lower alkyl has from one to seven, preferably from one to four, carbon atoms, e.g. N-cyclopentyl-methylamino, N - (2 - cyclopentylethyl) - amino, N - cyclohexylmethylamino, N-(1-cyclohexylethyl)-amino and the like, or N-cycloalkenyl-lower alkyl, in which cyclo-alkenyl has from five to eight, preferably from five to seven, carbon atoms, and lower alkyl has from one to seven, preferably from one to four, carbon atoms, e.g. N - (1 - cyclopentenyl) - methyl - amino, N - [2 - (3-cyclopentenyl) - ethyl] - amino, N - (2 - cyclohexenyl)-methyl-amino, N-[1-(3-cyclohexenyl)-ethyl]-amino and the like.

An N-monosubstituted amino group is also an N-carbocyclic aryl-amino group, in which carbocyclic aryl is more especially monocyclic carbocyclic aryl, e.g. phenyl or substituted phenyl, or an N-carbocyclic aryl-aliphatic substituted amino group, especially N-monocyclic carbocyclic aryl-lower alkyl-amino, in which lower alkyl has from one to four carbon atoms, such as N-phenyl-lower alkyl-amino, e.g. N-benzyl amino, N-(1-phenylethyl)-amino, N-(2-phenylethyl)-amino and the like, or N-substituted phenyl-lower alkyl-amino. The carbocyclic aryl, such as monocyclic carbocyclic aryl, particularly phenyl, portion of the above N-substituted amino groups may contain one or more than one of the same or of different substituents, such as, for example, lower alkyl, e.g. methyl, ethyl, n-propyl, isopropyl and the like, lower alkoxy, e.g. methoxy, ethoxy, n-propyloxy and the like, halogeno, e.g. fluoro, chloro, bromo and the like, trifluoromethyl, nitro, amino, such as N,N-di-lower alkyl-amino, e.g. N,N-dimethyl-amino, N,N-diethylamino and the like.

Other N-monosubstituted amino groups attached to the 18-position of the compounds of this invention and represented in the above formula by the group, Am, are N-heterocyclic aryl-amino groups, more especially N-monocyclic heterocyclic aryl-amino, such as N-(pyridyl)-amino, e.g. N-(2-pyridyl)-amino, N-(3-pyridyl)-amino, N-(4-pyridyl)-amino and the like, N-thienyl-amino, e.g. N-(2-thienyl)-amino and the like, N-furyl-amino, e.g. N-(2-furyl)-amino and the like, or N-heterocyclic aryl-aliphatic substituted amino groups, especially N-monocyclic heterocyclic aryl-lower alkyl-amino, in which lower alkyl has from one to four carbon atoms, such as N-(pyridyl-lower alkyl)-amino, e.g. N-(2-pyridylmethyl)-amino, N-[2-(4-pyridyl)ethyl]-amino and the like, N-thienyl-lower alkyl-amino, e.g. N-(2-thienyl)-amino and the like, N-furyl-lower alkyl-amino, e.g. N-(2-furfuryl)-amino and the like.

An N,N-disubstituted amino group attached to the 18-position may be represented, for example, by an N,N-di-aliphatic substituted amino group, such as N,N-di-lower alkyl-amino, in which lower alkyl has from one to seven, preferably from one to four, carbon atoms, e.g. N,N-dimethylamino, N - ethyl - N - methyl - amino, N,N - diethylamino, N,N-di-n-propylamino and the like, N-hydroxy-lower alkyl-N-lower alkyl-amino, in which hydroxy-lower alkyl has from two to four carbon atoms, e.g. N-(2-hydroxyethyl)-N-methyl-amino and the like, N,N-di-(hydroxy-lower alkyl)-amino, e.g. N,N-di-(2-hydroxy-ethyl)-amino and the like, N-etherified hydroxy-lower alkyl-N-lower alkyl-amino, in which etherified hydroxy-lower alkyl has from two to four carbon atoms, e.g. N-(2-methoxyethyl)-N-methyl-amino and the like. It may also be an N-aliphatic substituted N-cycloaliphatic substituted amino group, such as N-cycloalkyl-N-lower alkyl-amino, in which cycloalkyl has from three to eight, particularly from five to seven, carbon atoms, e.g. N-cyclopentyl-N-methyl-amino, N-cyclohexyl-N-ethyl-amino and the like, an N-aliphatic substituted N-carbocyclic aryl-aliphatic substituted amino group, particularly N-lower alkyl-N-phenyl-lower alkyl, e.g. N-benzyl-N-methyl-amino, N-ethyl-N-(1-phenylethyl)-amino, N-methyl-N-(2-phenylethyl)-amino and the like, or any other suitable N,N-di-substituted amino group.

An N,N-di-substituted amino group, represented by the group Am in the above formula, may also be an N,N-alkylene-imino group, in which alkylene has from four to six carbon atoms, for example, 1-pyrrolidino, e.g. 1-pyrrolidino, 2-methyl-1-pyrrolidino and the like, 1-piperidino, e.g. 1-piperidino, 2-methyl-1-piperidino, 3-methyl-1-piperidino, 4-methyl - 1 - piperidino, 3-hydroxy-1-piperidino, 3-acetoxy-1-piperidino, 3-hydroxymethyl-1-piperidino and the like, 1-N,N-(1,6-hexylene)-imino or any other N,N-alkylene-imino group, an N,N-oxa-alkylene-imino group, in which alkylene has preferably four carbon atoms, for example, 4-morpholino, e.g. 4-morpholino, 2-methyl-4-morpholine and the like, an N,N-thiaalkyleneimino group, in which alkylene has preferably four carbon atoms, for example, 4-thiamorpholino, e.g. 4-thiamorpholino and the like, or an N,N-aza-alkylene-imino group, in which alkylene has from four to six carbon atoms, for example, piperazino, or 4-lower alkyl-1-piperazino, e.g. 4-methyl-1-piperazino, 4-ethyl-1-piperazino and the like, as well as 4-(2-hydroxyethyl)-1-piperazino, 4-(2-acetoxyethyl)-1-piperazino and the like, 1-N,N-(3-aza, 1,6-hexylene)-imino, e.g. 1-N,N-(3-aza-3-methyl-1,6-hexylene)-imino and the like, 1-N,N-(4-aza-1,7-heptylene)-imino, e.g. 1-N,N-(4-aza-4-methyl-1,7-heptylene)-imino and the like.

Salts of the compounds of this invention are primarily pharmaceutically acceptable, non-toxic acid addition salts, such as those with pharmaceutically acceptable inorganic acids, e.g. hydrochloric, hydrobromic, sulfuric, phosphoric acids and the like, organic carboxylic acids, e.g. acetic, succinic, maleic, fumaric, tartaric, citric acid and the like, or organic sulfonic acids, e.g. methane sulfonic, 2-hydroxyethane sulfonic, ethane 1,2-disulfonic, p-toluene sulfonic acid, naphthalene 2-sulfonic acid and the like.

Also included within the scope of the present invention are the N-oxides of the above compounds, as well as the pharmaceutically acceptable, non-toxic acid addition salts of these N-oxides, such as those with the above-mentioned pharmaceutically acceptable, inorganic or organic acids.

In view of the fact that several asymmetric carbon atoms are present in the compounds of this invention, the latter may be obtained in the form of a mixture of racemates, racemates or optically pure compounds.

The compounds of this invention have useful pharmacological effects, which, in view of the antihypertensive and/or tranquilizing effects of known compounds having comparable chemical structures, are unexpected. Thus, compounds of this invention show antifibrillatory effects and can, therefore, be used in the treatment of neurogenic or cardiogenic ventricular or auricular fibrillation. Furthermore, compounds of this invention, particularly those which have no substituent attached to the 17-position, i.e. in which the group $R_2$ in the above formula stands for hydrogen, exhibit curare-type properties, i.e. they block the excitatory components of the nicotinic actions of acetylcholine and its cogeners on skeletal muscle and ganglia and thus prevent the response of the skeletal muscle fiber to motor nerve impulses. They can, therefore, be used as adjuvants in anesthesia for the relaxation of skeletal muscles so that operative manipulations are facilitated, as well as to prevent trauma in shock therapy, or in the treatment of spastic disorders and the like.

A group of preferred compounds is represented by the following formula

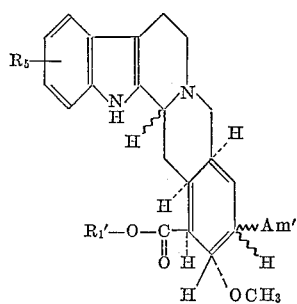

in which the group $R_1'$ is lower alkyl, particularly methyl, $R_5$ is hydrogen or lower alkoxy, particularly methoxy, whereby $R_5$ is preferably attached to the 10-position or the 11-position, and the group Am' is N-lower alkyl-amino, N,N-di-lower alkyl-amino or N,N-alkylene-imino, in which alkylene has from four to six carbon atoms, or pharmaceutically acceptable, non-toxic acid addition salts thereof.

Another group of preferred compounds is represented by the formula

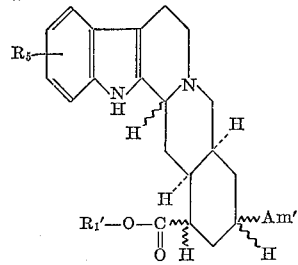

in which $R_1'$, $R_5$ and Am' have the previously-given meaning, or the pharmaceutically acceptable, non-toxic acid addition salts thereof.

The compounds of this invention may be used in the form of compositions for enteral or parenteral use, which contain the new compounds in admixture with an inorganic or organic, solid or liquid carrier. For making up these compositions there can be employed inert substances, which are compatible with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known inert carrier used in such preparations. The latter may be in solid form, for example, as tablets, capsules, dragrees and the like, or in liquid form, for example, as solutions, suspensions, emulsions and the like. If desired, they may contain additional substances, such as preserving, stabilizing, wetting, emulsifying agents and the like, salts for varying the osmotic pressure, buffers or any other auxiliary substances. They may also contain, in combination, other useful substances.

The compounds of this invention may be prepared, for example, by treating a 17α-$R_2'$-20α-yohimban-18-one 16β-carboxylic acid ester, in which $R_2'$ is lower alkoxy and in which the hydrogen atom attached to the 3-position may have the α-configuration or the β-configuration, especially a compound of the formula

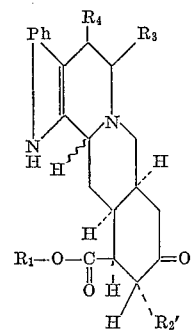

in which Ph, $R_1$, $R_3$ and $R_4$ have the previously-given meaning, and in which $R_2'$ is lower alkoxy, with an N-substituted amine, especially an amine of the formula H-Am, in which Am has the previously-given meaning, in the presence of catalytically activated hydrogen, and, if necessary, separating a resulting mixture of compounds and isolating an 18-N-substituted amino-17-$R_2$-20α-yohimbane 16-carboxylic acid ester, especially a compound of the formula

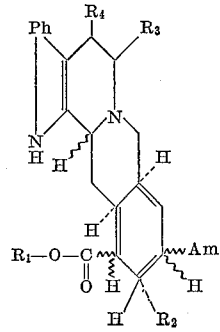

in which Ph, $R_1$, $R_2$, $R_3$, $R_4$ and Am have the previously-given meaning, and, if desired, converting in a resulting compound the 16-carboxylic acid ester group into the free carboxyl group and/or into another carboxylic acid ester group, and/or, if desired, converting a resulting salt into the free compound or into another salt thereof, and/or, if desired, converting a resulting free compound into an N-oxide thereof, and/or, if desired, converting a resulting salt or an N-oxide into a salt thereof, and/or, if desired, separating a mixture of isomers into the single isomers.

Treatment of the starting material with the N-substituted amine in the presence of catalytically activated hydrogen is carried out according to known methods, preferably in the presence of a diluent, such as a lower alkanol, e.g. methanol, ethanol and the like, or any other suitable diluent. A suitable catalyst contains preferably a metal of the eighth group of the periodic system, e.g. nickel, palladium, platinum, rhodium and the like, and is represented, for example, by Raney nickel, palladium on charcoal and the like. The hydrogen is employed at the atmospheric pressure or at an elevated pressure, and the reaction is carried out at room temperature, if necessary, at an elevated temperature. In the course of the reaction, particularly when elevated temperatures are involved, isomerization may occur at the 3-position; thus, a hydrogen attached to this position and having the β-configuration, may isomerize to the α-configuration.

A resulting mixture of compounds is separated according to known methods, for example, by fractionated crystallization, adsorption and fractionated elution and the like, and the desired product is isolated.

The starting materials used in the above reaction may be prepared, for example, by reacting an 18-organic sulfonyloxy-20α-yohimbane 16β-carboxylic acid ester, in which the 18-organic sulfonyloxy group and the hydrogen attached to the 3-position may have either the α-configuration or the β-configuration, with a di-lower alkyl sulfoxide, such as dimethylsulfoxide, preferably in the presence of a mild base, such as N,N,N-triethylamine and the like. An organic sulfonyloxy group is, for example, an aliphatic sulfonyloxy group, such as lower alkyl-sulfonyloxy, e.g. methylsulfonyloxy, ethylsulfonyloxy and the like, but more especially a carbocyclic aryl sulfonyloxy group, such as phenylsulfonyloxy, (halogeno-phenyl)-sulfonyloxy, e.g. 4-bromo-phenyl-sulfonyloxy and the like, (nitrophenyl)-sulfonyloxy, e.g. 4-nitro-phenyl-sulfonyloxy, 3-nitro-phenyl-sulfonyloxy and the like, or any other suitable organic sulfonyloxy group.

Compounds of this invention, in which the 17-position is substituted by lower alkoxy, may also be prepared, for example, by treating an 18-organic sulfonyloxy-17α-$R_2'$-20α-yohimbane 16β-carboxylic acid ester, in which $R_2'$ is lower alkoxy, and in which the hydrogen atom attached to the 3-position may have the α-configuration or the β-configuration, especially of a compound of the formula

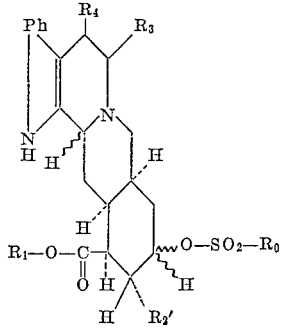

in which Ph, $R_1$, $R_3$ and $R_4$ have the previously-given meaning, $R_2'$ stands for lower alkoxy, and $R_0$ is an organic radical, with an N-substituted amine, particularly an amine of the formula H-Am, in which Am has the previously-given meaning, and, if desired, the optional steps are carried out.

The above reaction is preferably carried out by reacting the starting material and the amine in the presence of a suitable diluent, e.g. p-dioxane and the like, and at an elevated temperature. If necessary, it may be performed in a closed vessel and/or in the atmosphere of an inert gas, e.g. nitrogen. In the course of the reaction, particularly at elevated temperatures, isomerization may occur at the 3-position; thus, a hydrogen attached to this position and having the β-configuration may isomerize to the α-configuration.

The starting materials used in the above reaction are known; they may be prepared by esterifying the 18-hydroxyl group in an 18-hydroxy-17α-$R_2'$-20α-yohimbane 16β-carboxylic acid ester by treatment with an organic sulfonic acid halide, particularly chloride, in the presence of a suitable base, e.g. pyridine and the like.

In a resulting compound, the 16-esterified carboxyl group may be hydrolized to a 16-carboxyl group, which may then be converted into another 16-esterfied carboxyl group. Hydrolysis of the 16-esterified carboxyl group may be carried out according to known methods, for example, by treatment with an alkali metal hydroxide, e.g. sodium hydroxide, potassium hydroxide and the like, in a lower alkanol, e.g. methanol, ethanol, and the like, or, preferably, in an aqueous solution of such lower alkanol. The 16-carboxyl group in a resulting 18-N-substituted amino-17α-$R_2$-20α-yohimbane 16-carboxylic acid may be re-esterified according to known methods, for example, by treating the starting material, preferably a solution thereof, with a lower diazo-alkane, e.g. diazomethane, diazoethane and the like, or with a substituted lower diazo-alkane, e.g. 2-methoxy-diazoethane, 2-N,N-dimethylamino-diazoethane and the like.

In a resulting compound, the 16-esterified carboxyl group may also be converted into another 16-esterified carboxyl group by transesterification according to known methods. For example, the resulting 18-N-substituted amino-17α-$R_2$-20α-yohimbane 16-carboxylic acid ester may be treated with an alcohol, primarily a lower alkanol, e.g. methanol, ethanol, propanol, n-butanol, isobutanol and the like, or a substituted lower alkanol, e.g. 2-methoxyethanol, 2-N,N-dimethylaminoethanol and the like, in the presence of a transesterification reagent. Suitable transesterification reagents are alkoxide ions as furnished, for example, by metal alcoholates, especially an alkali metal lower alkanolate, e.g. lithium, sodium or potassium methanolate, ethanolate, n-propanolate, n-butanolate, isobutanolate and the like, alkali metal cyanides, e.g. potassium cyanide and the like, strong quaternary ammonium hydroxides, e.g. benzyl-trimethyl-ammonium hydroxide and the like, as well as acidic transesterification reagents, such as an inorganic acid, e.g. tungstic acid and the like, or an organic acid, e.g. p-toluene sulfonic acid and the like, or any other suitable reagent.

The compounds resulting from the described procedure may be obtained in the form of the acid addition salts thereof. A salt may be converted into the free base, for example, by reacting the former with an alkaline reagent, such as, for example, aqueous ammonia, silver oxide and the like, or with a hydroxyl ion exchange resin, or any other suitable reagent.

A salt may be converted into another salt, for example, by reacting the former with a metal, e.g. sodium, potassium, barium, silver and the like, salt of an inorganic or organic acid and isolating the resulting salt.

A free compound may be converted into its salt, for example, by treating a solution of the free base in a suitable solvent with an acid or a solution thereof and isolating the resulting salt. The salts may be obtained in the form of their hydrates or may contain solvent of crystallization.

N-oxides of the compounds of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, an organic peracid, such as an organic percarboxylic acid, e.g. peracetic, perbenzoic, monoperphthalic acid and the like, as well as an organic persulfonic acid, e.g. p-toluene persulfonic acid and the like. In the N-oxidation reaction an excess of the oxidation reagent and/or an increase in temperature should be avoided in order to prevent oxidative degradation.

A resulting N-oxide free base may be converted into an acid addition salt according to the above-described procedure.

The compounds of the present invention, as well as the starting materials and intermediates used in their formation, or derivatives thereof, may be present in the form of mixtures of racemates, single racemates or antipodes.

Mixtures of racemates of final products or starting materials may be separated into the single racemates on the basis of physico-chemical differences, for example, by fractionated crystallization and the like.

Racemates of intermediates and final products may be resolved into antipodes, for example, by treating a solution of the free racemic base in a suitable inert solvent with one of the optically active forms of an acid having an asymmetric carbon atom, or a solution thereof. Especially useful as optically active forms of salt-forming acids having an asymmetric carbon atom are D- and L-tartaric acid, as well as the optically active forms of di-o-toluyl-tartaric, malic, mandelic, camphor-10-sulfonic, quinic acid and the like. A salt may then be isolated, which is formed by the optically active acid with one of the optically active forms of the base. From a resulting salt, the free and optically active compounds may be obtained according to known methods used for the conversion of a salt into a free compound, for example, as outlined before; a resulting optically active base may be converted into an acid addition salt, an N-oxide or an acid addition salt of an N-oxide thereof according to the previously-described procedure. The optically active forms may also be obtained by resolution with biochemical methods.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

*Example 1*

A mixture of 2.0 g. of methyl 18-desoxy-18-oxo-reserpate, 1.0 g. of a palladium catalyst (10 percent palladium on charcoal) and 20 ml. of pyrrolidine in 50 ml. of ethanol is treated for three days with hydrogen under atmospheric pressure at room temperature. The hydrogenation is interrupted after 335 ml. of hydrogen have been absorbed; the reaction mixture is filtered and the filtrate is evaporated to dryness to yield 1.92 g. of a residue, which is dissolved in methylene chloride and chromatographed on 40 g. of aluminum oxide (Woelm activity II–III, neutral). The column is developed as follows:

| Fraction | Solvent | Amount, ml. | Product, g. |
|---|---|---|---|
| 1 | methylene chloride | 200 | 0.7 |
| 2 | do | 200 | 0.2 |
| 3 | methylene chloride containing 5 percent of methanol. | 200 | 1.0 |

Fraction 1 is recrystallized several times from ethyl acetate and yields 0.2 g. of methyl 18-desoxy-18α-(1-pyrrolidino)-3-iso-reserpate of the formula

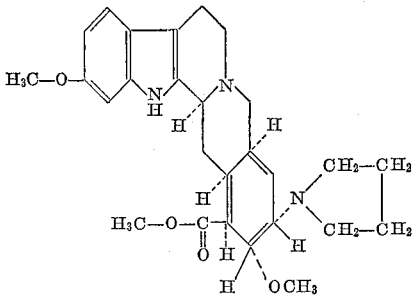

which melts at 275–277°; $[\alpha]_D^{24} = -27.6°$ (in chloroform). It analyzes as follows for $C_{27}H_{37}N_3O_4$ (467.59):

Calculated: C, 69.35; H, 7.98; N, 8.99; $OCH_3$, 19.9. Found: C, 69.63; H, 7.99; N, 9.08; $OCH_3$, 20.56. Its dihydrochloride (lyophylized) melts at 250–258°.

Fraction 3 yields 0.37 g. of a crystalline substance by recrystallization from ethyl acetate which is combined with the same fraction from two analogous experiments for a total of 1.01 g. of material after recrystallization from ethyl acetate, which is rechromatographed as shown above. The crystalline material is recrystallized from ethyl acetate to yield 0.76 g. of methyl 17α-desmethoxy-18-desoxy-18ξ-(1-pyrrolidino)-3-iso-16ξ-reserpate of the formula

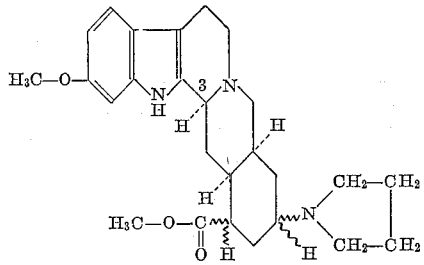

which melts at 245–247°; $[\alpha]_D^{24} = -35.8°$ (in chloroform). The product analyzes as follows for $C_{26}H_{35}N_3O_3$ (437.56):

Calculated: C, 71.36; H, 8.06; N, 9.60; $OCH_3$, 14.20. Found: C, 71.25; H, 8.17; N, 10.03; $OCH_3$, 15.00, and its rotation in chloroform is $[\alpha]_D^{24} = -36°$. The infrared absorption spectrum in chloroform shows the bands found to be characteristic of compounds having a 3α-hydrogen (Wenkert et al., J. Am. Chem. Soc., vol. 78, p. 6417 (1956)). Its dihydrochloride trihydrate (lyophylized) melts at 216–233°.

The starting material used in the above reaction may be prepared as follows: To a solution of 10.0 g. of methyl reserpate in 70 ml. of pyridine is added 15.8 g. of 4-bromo-benzene sulfonyl chloride; the reaction mixture is allowed to stand at room temperature for 2½ days and is then poured into ice-water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4-bromo-phenyl-sulfonyl)-reserpate is recrystallized from acetone, M.P. 209–212°; yield: 5.64 g.

A mixture of 3.17 g. of methyl 18-O-(4-bromo-phenylsulfonyl)-reserpate, 0.6 g. of N,N,N-triethylamine and 15 ml. of dimethyl sulfoxide is heated at 100° over a period of three hours while stirring. The cooled solution is poured into 100 ml. of a cold, approximately four percent aqueous solution of sodium carbonate, the resulting precipitate is filtered off and the solid material is dissolved in methylene chloride. The organic solution is washed with dilute aqueous sodium carbonate and then with saturated aqueous sodium chloride solution, dried and evaporated. The residue is triturated with diethyl ether, the crystalline material is filtered off and washed with diethyl ether to yield 1.5 g. of methyl 18-desoxy-18-oxo-reserpate, which melts at 240–241° (decomposition) after several recrystallizations from 95 percent ethanol; $[\alpha]_D^{24} = -17°$ (in chloroform).

*Example 2*

A mixture of 2.0 g. of methyl 18-desoxy-18-oxo-reserpate, 1.0 g. of a palladium catalyst (10 percent on charcoal) and 20 ml. of piperidine in 50 ml. of ethanol is treated for four days with hydrogen under atmospheric pressure and at room temperature; a total of 280 ml. of hydrogen is absorbed. The reaction mixture is filtered, the filtrate is evaporated under reduced pressure, and the residue is dissolved in 100 ml. of 2 percent aqueous hydrochloric acid. The organic material is extracted with two portions of 100 ml. and 75 ml., respectively, of methylene chloride, and each methylene chloride extract is washed with 100 ml. of 2 percent aqueous hydrochloric acid and 100 ml. of water. The organic extracts are discarded; the aqueous washes are made basic with aqueous ammonia and extracted with portions of 100 ml. and 75 ml., respectively, of methylene chloride. The combined organic extracts are filtered through a diatomaceous earth preparation (Florisil) and evaporated to dryness.

The residue is chromatographed on 40 g. of aluminum oxide (Woelm activity II–III, neutral):

| Fraction | Solvent | Amount, ml. | Product, g. |
|---|---|---|---|
| 1 | methylene chloride | 250 | 0.85 |
| 2 | do | 200 | 0.12 |
| 3 | do | 100 | 0.05 |
| 4 | methylene chloride containing 5 percent of methanol. | 200 | 0.88 |

Fraction 1 is recrystallized from ethyl acetate to yield 0.35 g. of methyl 17α-desmethoxy-18ξ-(1-piperidino)-16ξ-reserpate of the formula

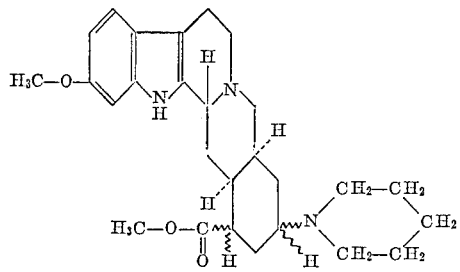

which melts at 203–206°; its $[\alpha]_D^{24} = -31.7°$ (in chloroform) and it analyzes for $C_{27}H_{37}N_3O_3$ (451.59):

Calculated: C, 71.81; H, 8.26; N, 9.31. Found: C, 71.62; H, 8.30; N, 9.02. Its infrared absorption spectrum in chloroform does not show the bands characteristic for compounds having a 3α-hydrogen, and its dihydrochloride (lyophylized) melts at 235–240°.

*Example 3*

A mixture of 4.0 g. of methyl 18-desoxy-18-oxo-reserpate, 2.0 g. of a palladium catalyst (10 percent palladium on charcoal) and 40 ml. of n-propylamine in 100 ml. of ethanol is treated with hydrogen under atmospheric pressure and at room temperature. After an uptake of 432 ml. of hydrogen, the hydrogenation is interrupted, the catalyst is filtered off, and the filtrate is evaporated under reduced pressure. The crude residue is dissolved in 50 ml. of methylene chloride and is chromatographed on 55 g. of aluminum oxide (activity II–III, neutral).

| Fraction | Solvent | Amount, ml. | Product, g. |
|---|---|---|---|
| 1 | methylene chloride | 200 | 0.12 |
| 2 | do | 200 | 2.87 |
| 3 | do | 200 | 0.10 |
| 4 | methylene chloride containing 5 percent of methanol. | 200 | 0.96 |
| 5 | do | 100 | 0.02 |

Fraction 2 yields 1.5 g. of crystalline material after crystallization from ethyl acetate and methylene chloride representing the methyl 18-desoxy-18α-n-propylamino-reserpate of the formula

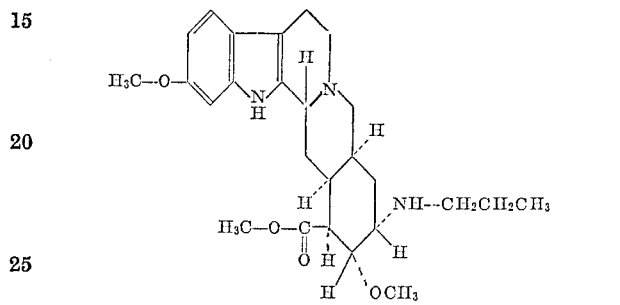

This compound melts at 219.5–220°; $[\alpha]_D^{24} = -13.3°$ (in chloroform); and analyzes for $C_{26}H_{37}N_3O_4$ (455.58):

Calculated: C, 68.54; H, 8.19; N, 9.22; $OCH_3$, 20.4. Found: C, 68.42; H, 8.27; N, 9.35; $OCH_3$, 21.2. Its dihydrochloride monohydrate melts at 260–267°.

Fraction 4 is recrystallized from ethyl acetate, petroleum ether and ethyl acetate, and diethyl ether to yield 0.16 g. of methyl 18-desoxy-18β-n-propylamino-reserpate of the formula

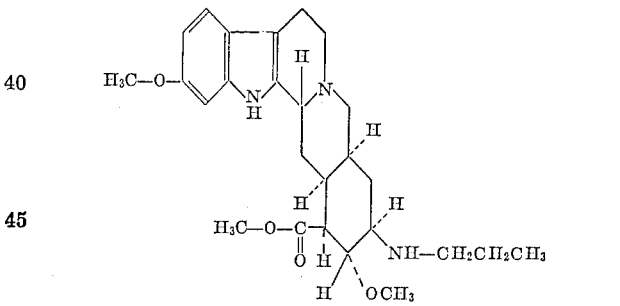

which melts at 190–193°; $[\alpha]_D^{24} = -92.5°$ (in chloroform); and analyzes for $C_{26}H_{37}N_3O_4$ (455.58):

Calculated: C, 68.54; H, 8.19; N, 9.22. Found: C, 68.53; H, 8.10; N, 9.21. Its dihydrochloride melts at 230–235°.

From the mother liquors of fraction 4, an additional compound is isolated and combined with the same fraction from several analogous procedures. The combined fractions are dissolved in methylene chloride and rechromatographed on 40 g. of neutral aluminum oxide (activity II–III); from the eluate with methylene chloride containing 5 percent of methanol is isolated 0.8 g. of a residue which is repeatedly recrystallized from ethyl acetate to yield 0.46 g. of methyl 17α-desmethoxy-18-desoxy-18ξ-n-propyl-amino-16ξ-reserpate of the formula

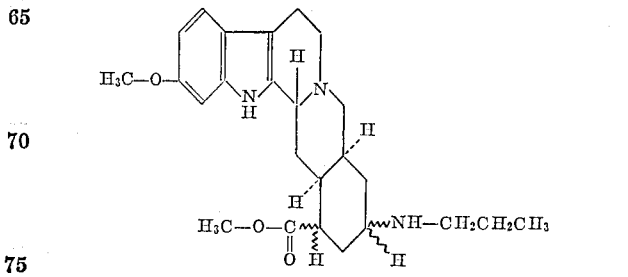

which melts at 170–172°; $[\alpha]_D^{24} = -39.6°$ (in chloroform); it analyzes for $C_{25}H_{35}N_3O_3$ (425.55):

Calculated: C, 70.56; H, 8.29; N, 9.88; $OCH_3$, 14.60. Found: C, 70.15; H, 8.45; N, 10.10; $OCH_3$, 14.49, and its infrared absorption spectrum does not show the characteristic 3α-hydrogen band. Its dihydrochloride trihydrate (lyophylized) melts at 233–245°.

Example 4

A mixture of methyl 18-epi-O-(3-nitro-phenyl-sulfonyl)-reserpate and 24 g. of n-propylamine in 75 ml. of p-dioxane in a sealed vessel is heated for three days on a steam bath. The solvent is then evaporated, the residue is dissolved in methylene chloride, and the organic solution is washed twice with a 5 percent aqueous solution of sodium carbonate and once with a saturated aqueous solution of sodium chloride. After filtration, the organic solution is evaporated under reduced pressure to yield 2.5 g. of a foam, which crystallizes on adding ethyl acetate and then diethyl ether. The resulting material is filtered off and chromatographed on 20 g. aluminum oxide (activity II–III, neutral) to yield the methyl 18-desoxy-18β-n-propylamino-reserpate, which is identical with the product isolated from fraction 4, described in Example 3; it melts at 188–181°; $[\alpha]_D^{27} = -92.1°$ (in chloroform). Its noncrystalline maleate, M.P. 155–160°, is prepared by reacting the free compound with a molar amount of maleic acid.

Example 5

A mixture of 3.17 g. of methyl 18-O-(4-bromo-phenyl-sulfonyl)-reserpate and 5.91 g. of n-propylamine in 100 ml. of p-dioxane in a sealed pressure bottle and under an atmosphere of nitrogen is heated on the steam bath for eight days. The solvent is then evaporated, the residue is taken up in methylene chloride, the insoluble material is filtered off, and the filtrate is washed with an aqueous solution of sodium carbonate, water and a saturated aqueous solution of sodium chloride, dried and evaporated. The residue is triturated with low-boiling petroleum ether to yield 2.05 g. of methyl 18-desoxy-18α-n-propylamino-reserpate, which melts at 219.5–220° after recrystallization from acetonitrile; $[\alpha]_D^{24} = -13°$ (in chloroform), and is identical with the compound isolated from fraction 2, described in Example 3.

Example 6

A mixture of 15.7 g. of methyl 18-O-(4-bromo-phenyl-sulfonyl)-reserpate and 22.5 g. of ethylamine in 750 ml. of p-dioxane in a pressure bottle is heated on the steam bath for four days and worked up as described in Example 5. The desired methyl 18-desoxy-18α-ethylamino-reserpate melts at 225–226° (decomposition) after recrystallization from acetonitrile; $[\alpha]_D^{24} = -26°$ (in chloroform); yield: 5.6 g.; its dihydrochloride sesquihydrate melts at about 250–260° (decomposition).

Other compounds, which are prepared according to procedures analogous to the one given above are, for example:

Methyl 18 - desoxy - 18α - methylamino - reserpate (the treatment with methylamine is carried out in a steel bomb), M.P. 230–231.5° (after crystallization from a hot mixture of toluene and cyclohexane and recrystallizations from acetonitrile); $[\alpha]_D^{24} = -37°$ (in chloroform); the dihydrochloride dihydrate melts at 253–260° (decomposition);

Methyl 18α - benzylamino - 18 - desoxy - reserpate (the treatment with benzylamine is carried out under atmospheric pressure), M.P. 223–225° (after recrystallization from a mixture of methanol aond methylene chloride), $[\alpha]_D^{24} = +10°$ (in chloroform); the dihydrochloride hydrate melts at 253–258° (decomposition);

Methyl 18 - desoxy - 18α - N,N - dimethylamino - 3 - iso-reserpate, M.P. 220–221° (the residue from the methylene chloride solution is stirred with diethyl ether and the insoluble portion is recrystallized from acetonitrile; the product shows the characteristic infrared band for the 3-iso-compounds); $[\alpha]_D^{25} = -25°$ (in chloroform); the dihydrochloride hemihydrate, prepared by lyophylization, melts at 245–254° (decomposition);

Methyl 18-desoxy-18α-(1-pyrrolidino)-3-iso-reserpate, M.P. 268–269° (after recrystallization from methanol and methylene chloride); $[\alpha]_D^{27} = -32°$ (in chloroform); the maleate dihydrate, prepared by lyophylization, melts at 155–160°.

Example 7

A mixture of 3.17 g. of methyl 18-O-(4-bromo-phenyl-sulfonyl)-reserpate and 10 ml. of aniline is heated for five days at 100° while stirring in an atmosphere of nitrogen. The excess aniline is removed under reduced pressure and the residue is dissolved in methylene chloride. The organic solution is washed with an aqueous solution of sodium carbonate, water and a saturated solution of sodium chloride, dried and evaporated. The residue is crystallized from a mixture of methanol and methylene chloride to yield methyl 18-desoxy-18α-phenylamino-3-iso-reserpate of the formula

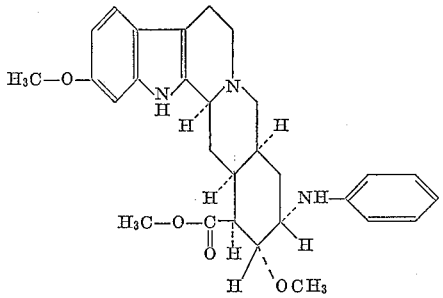

which melts at 285–287°; $[\alpha]_D^{24} = -85°$ (in chloroform). Its monohydrochloride, crystallized from acetone, melts at 284–286°.

The mother liquor from the first crystallization of methyl 18-desoxy - 18α - phenylamino - 3 - iso-reserpate is evaporated to a small volume and on cooling, the methyl 18-desoxy-18α-phenylamino-reserpate of the formula

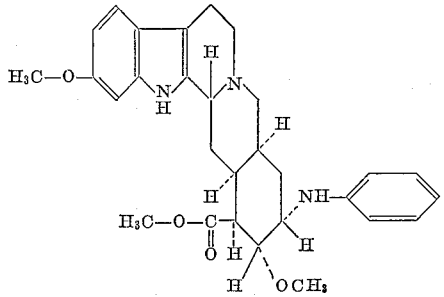

precipitates and is recrystallized from a mixture of methanol and methylene chloride, M.P. 269–270°; $[\alpha]_D^{24} = +30°$ (in chloroform). The dihydrochloride monohydrate, melts at 235–240°.

Selecting the appropriate starting materials and methods of preparation other 18-N-substituted amino-20α-yohimbane 16β-carboxylic acid esters may be prepared, such as, for example, other lower alkyl 18-N-substituted amino-18-desoxy-reserpates or lower alkyl 18-N-substituted amino-18-desoxy-3-iso-reserpates, e.g. methyl 17α-desmethoxy - 18 - desoxy - 18 - (N,N-dimethylamino)-3-iso-16ξ-reserpate, ethyl 18-desoxy-18α-(4-morpholino)-3-iso-reserpate and the like, lower alkyl 18-N-substituted amino-18-desoxy-9-methoxy-deserpidates or 18-N-substituted amino-18-desoxy-9-methoxy-3-iso - deserpidates, e.g. methyl 18-desoxy-18β-ethylamino-9-methoxy-deserpidate, methyl 17α-desmethoxy - 18 - desoxy - 9 - methoxy-18-(1-pyrrolidino)-3-iso-16ξ-reserpate and the like, lower alkyl 18-N-substituted amino-18-desoxy - 10 - methoxy-deserpidates or lower alkyl 18-N-substituted amino-18-desoxy-10-methoxy-3-iso-deserpidates, e.g. methyl 18-desoxy-18α-(N,N-diethylamino)-deserpidate, ethyl 18-desoxy-18α-(1-pyrrolidino)-3-iso-deserpidate and the like, lower alkyl 18-N-substituted amino-18-desoxy-11-ethoxy-deserpidates or lower alkyl 18 - N - substituted amino - 18 - desoxy-11-ethoxy-3-iso-deserpidates, e.g. methyl 18α-(n-butylamino)-18-desoxy-11-ethoxy-deserpidate, methyl 17α-desmethoxy-18-desoxy-11-ethoxy-18-(1-piperidino) - 3-iso-16ξ-deserpidate and the like, lower alkyl 18-N-substituted amino-18-desoxy - 12 - methoxy-deserpidates or lower alkyl 18-N-substituted amino-18-desoxy - 12 - methoxy-3-iso-deserpidates, e.g. n-propyl 17α-desmethoxy-18-desoxy-12-methoxy-18-(N,N-di-n-propylamino) - 3 - iso-16ξ-deserpidate, methyl 18-desoxy - 12 - methoxy - 18α-(4-methyl-1-piperazino)-3-iso-deserpidate and the like, lower alkyl 18-N-substituted amino-18-desoxy-deserpidates or lower alkyl 18-N-substituted amino-18-desoxy-3-iso-deserpidates, e.g. methyl 18-desoxy-18β-(1-piperidino) - deserpidate, methyl 17α-desmethoxy - 18 - desoxy-18α-(1-pyrrolidino)-3-iso-16ξ-deserpidate and the like, lower alkyl 18-N-substituted amino-18-desoxy - 5 - methyl-deserpidates or lower alkyl 18-N-substituted amino-18-desoxy-5-methyl-3-iso-deserpidates, e.g. methyl 18β - cyclohexylamino - 18 - desoxy-5-methyl-deserpidate, methyl 18 - desoxy - 5 - methyl - 18α-(4-morpholino) - 3 - iso - deserpidate and the like, lower alkyl 18 - N - substituted amino - 18 - desoxy - 6 - methyl-reserpates or lower alkyl 18 - N - substituted amino - 18-desoxy - 6 - methyl - 3 - iso - reserpates, e.g. methyl 18-desoxy-6-methyl-18β-(n-propylamino) - reserpate, methyl 17α-desmethoxy - 18 - desoxy - 6 - methyl-18α-(1-pyrrolidino)-3-iso-16ξ-reserpate and the like, lower alkyl 18-N-substituted amino-18-desoxy - 11 - methyl-deserpidates or lower alkyl 18-N-substituted amino-18-desoxy-11-methyl-3 - iso - deserpidates, e.g. methyl 18α-(n-butylamino)-18-desoxy - 11 - methyl-deserpidate, methyl 17α-desmethoxy-18-desoxy - 11 - methyl - 18 - (1-pyrrolidino)-3-iso-16ξ-deserpidate and the like, lower alkyl 18-N-substituted amino-18-desoxy-11-N,N-dimethylamino - deserpidates or lower alkyl 18-N-substituted amino-18-desoxy-11-(N,N-dimethylamino)-3-iso-deserpidates, e.g. methyl 18β-ethylamino-18-desoxy-11-(N,N-dimethylamino) - deserpidate, methyl 18-desoxy-11-(N,N-dimethylamino) - 18α-(1-pyrrolidino)-3-iso-deserpidate and the like, lower alkyl 18-N-substituted amino-18-desoxy-11-methylmercapto - deserpidates or lower alkyl 18-N-substituted amino-18-desoxy-11-methylmercapto-3-iso-deserpidates, e.g. methyl 18-desoxy - 18α - (N,N - diethylamino) - 11 - methylmercapto-deserpidate, ethyl 17α-desmethoxy-18-desoxy-11-methylmercapto-18-(1-pyrrolidino)-3-iso-16ξ-deserpidate and the like, lower alkyl 18-N-substituted amino-10-chloro-18-desoxy - deserpidates or lower alkyl 18 - N - substituted amino-10-chloro-18-desoxy-3-iso-deserpidates, e.g. methyl 10-chloro - 18 - desoxy-18α-(n-propylamino)-deserpidate, methyl 10-chloro-18-desoxy - 18α - (1-pyrrolidino)-3-iso-deserpidate and the like.

What is claimed is:
1. A member selected from the group consisting of a compound of the formula

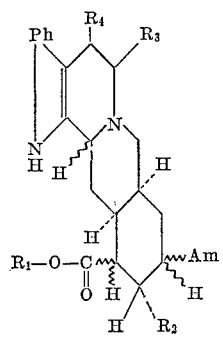

in which Ph stands for a member selected from the group consisting of 1,2-phenylene, (lower alkyl)-1,2-phenylene, (lower alkoxy)-1,2-phenylene, (lower alkylene-dioxy)-1,2-phenylene, (halogeno) - 1,2 - phenylene, (lower alkylmercapto) - 1,2 - phenylene and (N,N - di - lower alkylamino)-1,2-phenylene, $R_1$ is a member selected from the group consisting of lower alkyl, phenyl-lower alkyl, lower alkoxy lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, $R_2$ is a member selected from the group consisting of hydrogen and lower alkoxy, each of the groups $R_3$ and $R_4$ is a member selected from the group consisting of hydrogen and lower alkyl, and Am stands for a member selected from the group consisting of N-lower alkyl-amino, N-lower alkenyl-amino, N-cycloalkyl-amino, in which cycloalkyl has from three to eight carbon atoms, N-cycloalkenyl-amino, in which cycloalkenyl has from five to eight carbon atoms, N-cycloalkyl-lower alkyl-amino, in which cycloalkyl has from three to eight carbon atoms, N-cycloalkenyl-lower alkyl-amino, in which cycloalkenyl has from five to eight carbon atoms, N-phenyl-amino, N-phenyl-lower alkyl-amino, N,N-di-lower alkyl-amino, N-cycloalkyl-N-lower alkyl-amino, in which cycloalkyl has from three to eight carbon atoms, N - lower alkyl - N - phenyl - lower alkyl-amino, N,N-alkylene-imino, in which alkylene has from four to six carbon atoms, 4-morpholino, 4-thiamorpholino, 1-piperazino, and 4-lower alkyl-1-piperazino, a pharmaceutically acceptable, non-toxic acid addition salt thereof, an N-oxide thereof, and a pharmaceutically acceptable non-toxic acid addition salt of an N-oxide thereof.

2. A compound of the formula

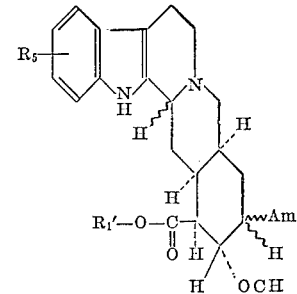

in which $R_1'$ stands for lower alkyl, $R_5$ is lower alkoxy, and Am' is N-lower alkyl-amino.

3. Methyl 18-desoxy-18α-ethylamino-reserpate.
4. Methyl 18-desoxy-18β-n-propylamino-reserpate.
5. Methyl 18-desoxy-18α - N,N - dimethylamino-3-iso-reserpate.
6. Methyl 18-desoxy-18α-phenylamino-reserpate.
7. A compound of the formula

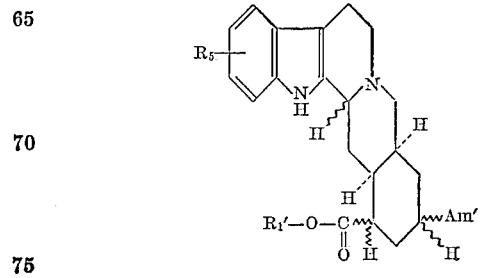

in which $R_1'$ stands for lower alkyl, $R_5$ is lower alkoxy, and Am' is N,N-alkylene-imino, in which alkylene has from four to six carbon atoms.

8. Methyl 17-desmethoxy - 18 - desoxy-18ξ-(1-pyrrolidino)-16ξ-reserpate.

9. Methyl 17α-desmethoxy - 18 - desoxy-18ξ-(1-piperidino)-16ξ-reserpate.

References Cited in the file of this patent

Theilheimer I—Synthetic Methods, volume 3 (1949), page 170. (Article No. 350.)

Theilheimer—Synthetic Methods, volume 5 (1951), page 242. (Article No. 313.)

Theilheimer—Synthetic Methods, volume 6 (1952), page 145. (Article No. 394.)

UNITED STATES PATENT OFFICE
CERTIFICATE OF CORRECTION

Patent No. 3,120,533                              February 4, 1964

Michael Mullen Robison et al.

It is hereby certified that error appears in the above numbered patent requiring correction and that the said Letters Patent should read as corrected below.

Column 16, lines 39 to 50, the formula should appear as shown below instead of as in the patent:

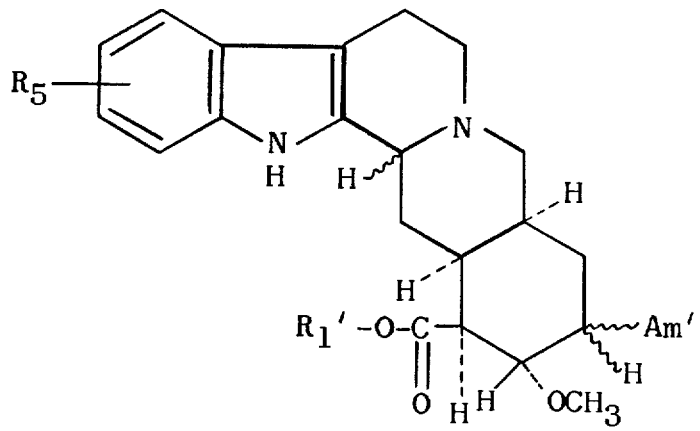

Signed and sealed this 23rd day of June 1964.

(SEAL)
Attest:

ERNEST W. SWIDER
Attesting Officer

EDWARD J. BRENNER
                                       Commissioner of Patents